United States Patent
Song

(10) Patent No.: US 7,212,401 B2
(45) Date of Patent: May 1, 2007

(54) SECURITY STRUCTURE OF PORTABLE HARD DISK DRIVE

(75) Inventor: Yew-Min Song, Taipei (TW)

(73) Assignee: Tatung Co., Ltd, Taipei (TW)

( * ) Notice: Subject to any disclaimer, the term of this patent is extended or adjusted under 35 U.S.C. 154(b) by 212 days.

(21) Appl. No.: 11/092,753

(22) Filed: Mar. 30, 2005

(65) Prior Publication Data

US 2006/0120032 A1 Jun. 8, 2006

(30) Foreign Application Priority Data

Dec. 8, 2004 (TW) .............................. 93138003 A

(51) Int. Cl.
*G06F 1/16* (2006.01)

(52) U.S. Cl. ...................................... 361/685

(58) Field of Classification Search ................. 361/685
See application file for complete search history.

*Primary Examiner*—Yean-Hsi Chang
(74) *Attorney, Agent, or Firm*—Lowe Hauptman & Berner, LLP

(57) ABSTRACT

A security structure of portable hard disk drive is disclosed to include a bracket fixedly mounted in a computer case, a plurality of portable hard disk drives inserted into respective sliding grooves inside the bracket at different elevations, and a locking rod, for example, a long screw for insertiing through a through hole on the top panel of the bracket and a respective through hole on each portable hard disk drive and threading into a nut at the bottom panel of the bracket to affix the portable hard disk drives to the bracket. The locking rod is kept from sight after installation of the portable hard disk drives in the bracket and closing of the computer case.

3 Claims, 2 Drawing Sheets

SECURITY STRUCTURE OF PORTABLE HARD DISK DRIVE

RELATED APPLICATION

The present application is based on, and claims priority from, Taiwanese Application Number 093138003, filed Dec. 8, 2004, the disclosure of which is hereby incorporated by reference herein in its entirety.

BACKGROUND OF THE INVENTION

1. Field of the Invention

The present invention relates to a security structure and more particularly, to a security structure of portable hard disk drive.

2. Description of Related Art

A computer may be quipped with a cap and a lock for locking portable hard disk drive(s) to the inside of the computer case. However, this arrangement does not guarantee a high security. Because the cap and the lock are exposed to the outside of the computer case, a person can access to storage data in the portable hard disk drive(s) easily by using a tool to damage the lock and open the cap.

Therefore, it is desirable to provide a security structure of portable hard disk drive that eliminates the aforesaid problem.

SUMMARY OF THE INVENTION

The present invention has been accomplished under the circumstances in view. The security structure of portable hard disk drive is installed in a computer case, which comprises a case body defining a space, and a case cover for closing the case body. The security structure of portable hard disk drive comprises a bracket, at least one portable hard disk drive, and at least one locking rod. The bracket is fixedly mounted inside the case body of the computer case, comprising a top panel, a bottom panel, and two side panels arranged in parallel at two sides between the top panel and the bottom panel. The side panels each have at least one sliding groove. The top panel has at least one through hole. The bottom panel has at least one through hole corresponding to the at least one through hole of the top panel.

The at least one portable hard disk drive insert into the bracket along the at least one sliding groove of the side panels of the bracket, the at least one portable hard disk drive having at least one through hole corresponding to the at least one through hole of the top panel and the at least one through hole of the bottom panel.

The at least one locking rod is inserting through the at least one through hole of the top panel and the at least one through hole of the at least one portable hard disk drive and the at least one through hole of the bottom panel to affix the at least one portable hard disk drive to the bracket.

After installation of the at least one portable hard disk drive in the bracket and closing of the case cover on the case body of the computer case, the at least one locking rod is kept from sight, ensuring high security of the installation.

Further, each locking rod can be a long screw, and a nut can be fixedly welded to the bottom panel of the bracket corresponding to the at least one through hole of the bottom panel of the bracket for receiving and threading with the long screw of the at least one locking rod (long screw).

DETAILED DESCRIPTION OF THE PREFERRED EMBODIMENT

Figure 1:
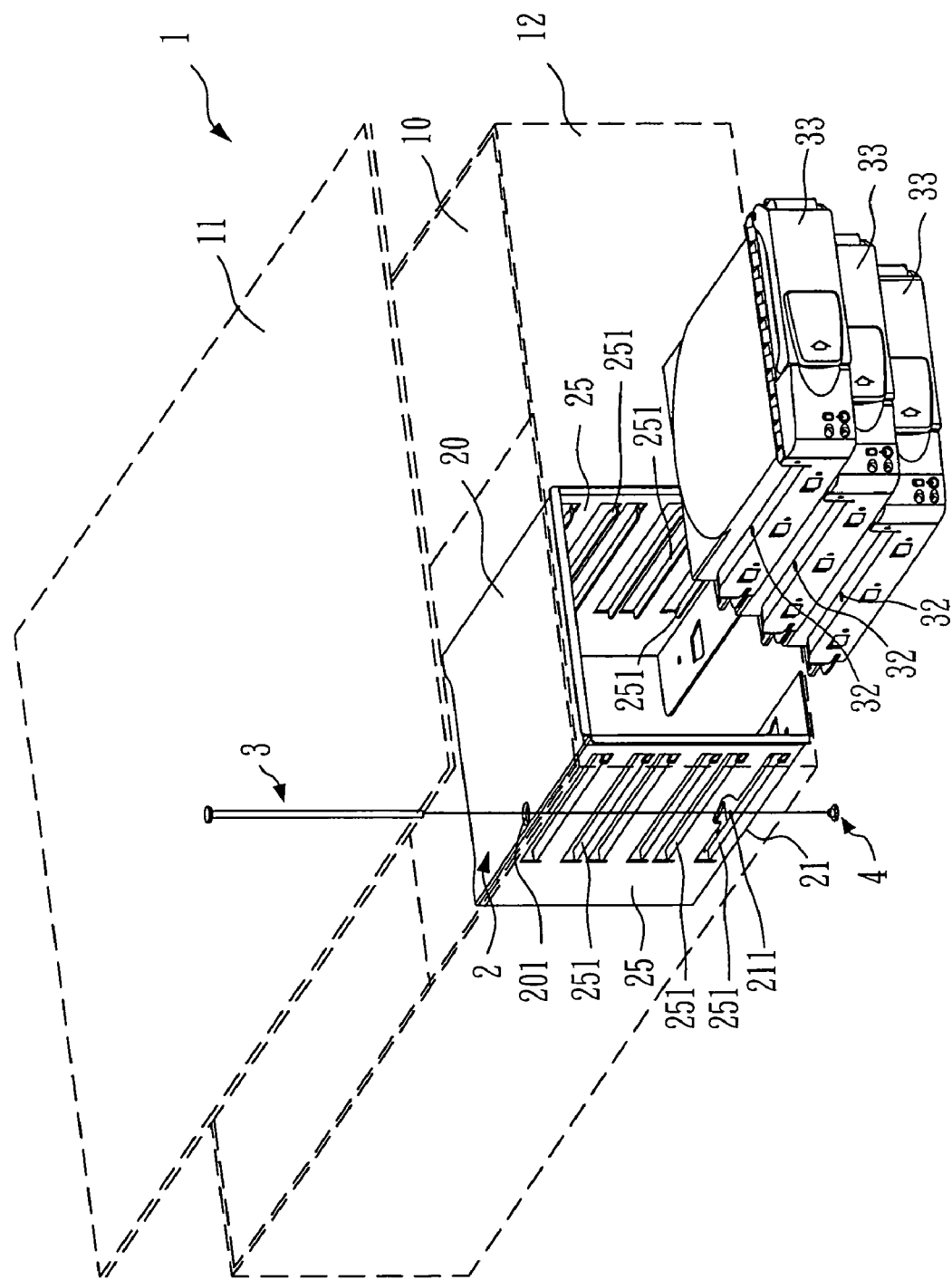
FIG. 1 is an exploded view of a security structure of portable hard disk drive according to the present invention.

Referring to FIG. 1, a security structure of portable hard disk drive is provided inside a computer case 1. The computer case 1 comprises a case body 11, which defines a space 10, and a case cover 12 covered on the top open side of the case body 11 to close the space 10.

The aforesaid security structure of portable hard disk drive comprises a bracket 2, a plurality of, for example, three portable hard disk drives 33, and a locking rod 3. The bracket 2 is fixedly mounted in the space 10 inside the computer case 1, comprising a top panel 20, a bottom panel 21, and two opposite side panels 25. The top panel 20 has a through hole 201 near one side panel 25. The bottom panel 21 has a through hole 211 corresponding to the through hole 201 of the top panel 20. The side panels 25 are vertically connected between the top panel 20 and the bottom panel 21 at two sides, each having three horizontally extending and vertically spaced sliding grooves 251.

The three portable hard disk drives 33 are respectively inserted into the sliding grooves 251 inside the bracket 2, each having a through hole 32 corresponding to the through hole 201 of the top panel 20 and the through hole 211 of the bottom panel 21.

The locking rod 3 according to the present preferred embodiment is a long screw used with a nut 4, The nut 4 is fixedly welded to the bottom panel 21 and aligned with the through hole 211 of the bottom panel 21.

Figure 2:
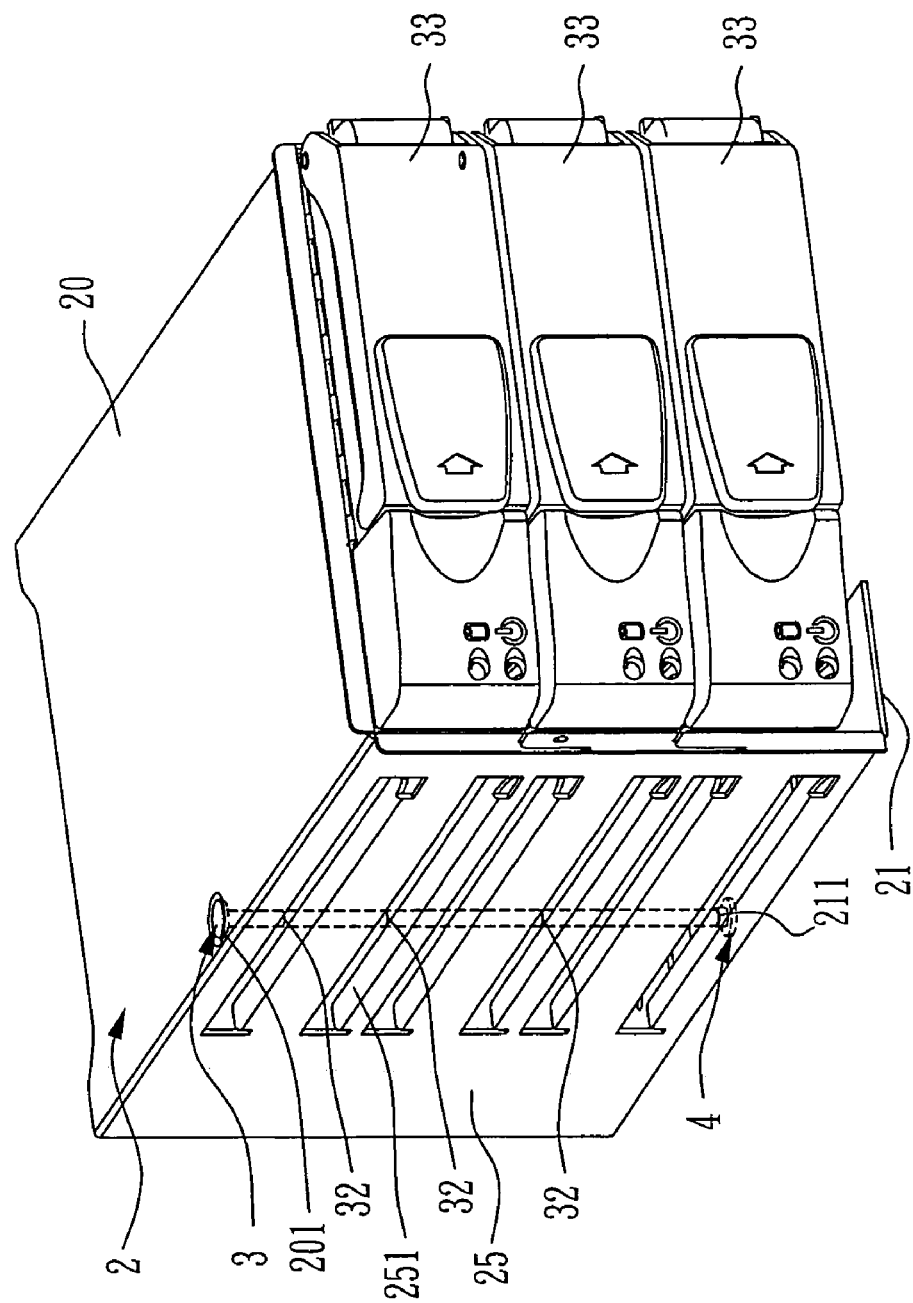
FIG. 2 is a schematic perspective view showing the portable hard disk drives locked in the bracket inside the computer case according to the present invention.

Referring to FIG. 2 and FIG. 1 again, the screw 3 is inserted through the through hole 201 of the bracket 2 and the through holes 32 of the portable hard disk drives 33 and the through hole 211 of the bottom panel and then threaded into the nut 4 to affix the portable hard disk drives 33 to the bracket 2 before closing of the case cover 11 on the case body 12. After installation of the portable hard disk drives 33 in the bracket 2, the case cover 11 is fastened to the case body 12.

Because the screw 3 does not pass through the computer case 1, it is kept from sight, prohibiting an illegal person from stealing the portable hard disk drives 33. This simple security structure of portable hard disk drive mounting design is easy and inexpensive to install, and ensures high security.

Although the present invention has been explained in relation to its preferred embodiment, it is to be understood that many other possible modifications and variations can be made without departing from the spirit and scope of the invention as hereinafter claimed.

What is claimed is:

1. A security structure of portable hard disk drive comprising:
    a bracket fixedly mounted inside a computer case, said bracket comprising a top panel, a bottom panel, and two side panels arranged in parallel at two sides between said top panel and said bottom panel, said side panels each having at least one sliding groove, said top panel having at least one through hole, said bottom panel having at least one through hole corresponding to the at least one through hole of said top panel;

at least one portable hard disk drive inserted into said bracket along the at least one sliding groove of said side panels of said bracket, said at least one portable hard disk drive having at least one through hole corresponding to the at least one through hole of said top panel and the at least one through hole of said bottom panel; and at least one locking rod inserted through the at least one through hole of said top panel and the at least one through hole of said at least one portable hard disk drive and the at least one through hole of said bottom panel to affix said at least one portable hard disk drive to said bracket.

2. The security structure of portable hard disk drive as claimed in claim 1, wherein said at least one locking rod is a long screw.

3. The security structure of portable hard disk drive as claimed in claim 2, further comprising at least one nut fixedly welded to said bottom panel corresponding to the at least one through hole of said bottom panel for receiving and threading with the long screw of said at least one locking rod.

* * * * *